(12) United States Patent
Shen (10) Patent No.: US 8,047,481 B2
(45) Date of Patent: Nov. 1, 2011

(54) CONTINUOUSLY ANGLE-ADJUSTABLE MULTIFUNCTION TRIPOD

(75) Inventor: Dar Tson Shen, Taoyuan (TW)

(73) Assignee: Suzhou Synta Optical Technology Co., Ltd., Suzhou (CN)

( * ) Notice: Subject to any disclaimer, the term of this patent is extended or adjusted under 35 U.S.C. 154(b) by 261 days.

(21) Appl. No.: 12/463,547

(22) Filed: May 11, 2009

(65) Prior Publication Data
US 2010/0282926 A1  Nov. 11, 2010

(51) Int. Cl.
  *F16M 11/02*  (2006.01)
(52) U.S. Cl. ............ 248/178.1; 248/187.1; 248/434; 248/435; 248/170; 248/173
(58) Field of Classification Search .......... 248/157, 248/371, 917, 919, 177.1, 178.1, 187.1, 163.1, 248/168, 434, 435, 170, 173, 440
See application file for complete search history.

(56) References Cited

U.S. PATENT DOCUMENTS

| 3,741,509 | A | * | 6/1973 | Kelly | 248/171 |
|---|---|---|---|---|---|
| D263,147 | S | * | 2/1982 | Iwasaki | D16/244 |
| 4,317,552 | A | * | 3/1982 | Weidler | 248/168 |
| 7,430,968 | B2 | * | 10/2008 | Clark | 108/115 |
| 7,490,797 | B1 | * | 2/2009 | Law | 248/163.2 |
| 2002/0011196 | A1 | * | 1/2002 | Floyd et al. | 108/157.16 |
| 2005/0056739 | A1 | * | 3/2005 | Koning et al. | 248/171 |
| 2007/0080486 | A1 | * | 4/2007 | Clark | 269/99 |

OTHER PUBLICATIONS

Chinese Office Action dated Sep. 7, 2005 for 200420086784.6.
Chinese Office Action dated Dec. 2, 2009 for 200510037323.9.

* cited by examiner

*Primary Examiner* — Terrell McKinnon
*Assistant Examiner* — Steven Marsh
(74) *Attorney, Agent, or Firm* — WPAT, P.C.; Anthony King (57) ABSTRACT

A continuously angle-adjustable multifunction tripod is provided. The continuously angle-adjustable multifunction tripod includes a connecting base, at least three legs, an adjusting cap, and a supporter. The adjusting cap and the supporter are disposed on and under the connecting base, respectively. Each of the legs is peripherally distributed around the supporter. Upper ends of the legs are movably connected to the connecting base. Distances between the adjusting cap, the connecting base and the supporter are adjustable along a vertical direction, and can be relatively fixed at anywhere therebetween. Meanwhile, a bottom of the adjusting cap and the supporter clamp and fix the legs, so that an angle of each of the legs relative to the horizontal plane can be arbitrarily adjusted in a range from 0° to 90° in accordance with variations of relative positions of the adjusting cap, the connecting base, and the supporter. The present invention has a simple and compact structure, small volume, light weight, low cost, and convenient to operate. Spans of the legs may be arbitrarily adjusted in a range from 0° to 180°, so that the tripod may be mounted quick and steadily in all kinds of complex environments. The present invention may be widely applied in areas of observation, photography, and illuminating, etc.

10 Claims, 9 Drawing Sheets

CONTINUOUSLY ANGLE-ADJUSTABLE MULTIFUNCTION TRIPOD

BACKGROUND OF THE INVENTION

1. Field of the Invention

The present invention relates generally to a tripod for supporting an instrument, such as a telescope, a camera, a camcorder or a measuring instrument, and more particularly, to a continuously angle-adjustable multifunction tripod.

2. The Prior Arts

A tripod is a device operated in accordance with the principle that a plane can be determined by three non-collinear points. A tripod is usually used for supporting a measuring instrument, a camcorder, an illuminating apparatus, or a laboratory appliance. A typical tripod is often provided with three legs designed to be extractable and retractable in order to adjust a supporting height, so that the instrument supported thereupon can be steadily operated at a certain height. Nowadays, tripods are more widely used, and therefore more functions and requirements are desired from tripods. For example, for observation equipment, such as an astronomical telescope, during the observation, even the least dither or vibration may cause a failed observation. Meanwhile, such observation equipment may usually be carried by a user, so as to be used in a variety of complex environments, such as a city, a village, a desert, and a mountain area. Therefore, a tripod has a structure which is simple, stable, easy to operate, may be steadily mounted in a variety of environments, and has an adjustable supporting height would be very indispensable. Unfortunately, none of the existing tripods may well satisfy the foregoing demands.

For example, Chinese Utility Model Patent Publication No. CN2724048, issued on Sep. 7, 2005, a tripod having three legs with an adjustable opening angle therebetween is disclosed. The tripod includes three legs, protection caps, leg connectors connecting every leg and the protection caps, a tripod head provided on the protection caps. Each protection cap is configured with a plurality of bayonets for defining a plurality of opening angles. The leg connectors which hinge jointed with the protection caps are configured with assembling slots. An elastic button is assembled to the assembling slots with pins and torsional springs. The button is held by the torsional springs for engaging with the bayonets of the protection caps. In such structure, the tripod is adapted for adjusting the opening angle of the legs by levels. Unfortunately, it is more difficult when using the tripod in an environment having more varied landforms and the tripod may need to be continuously fine tuned with respect to the spans of the legs.

Similarly, Chinese Invention Patent Publication No. CN1936690, issued on Mar. 28, 2007, a disclosed tripod for a camera also has similar disadvantages. This tripod provides an opening/closing mechanism disposed between a base of a leg and a body of the tripod for fast adjusting the opening angle of the legs. Although the adjustment to the spans between the legs may be realized, the adjustment is also conducted by levels, and therefore the adjustment is very restricted and may not adapt to complex environments. Further, the tripod employs many precise components, e.g., ratchets, for adjusting the opening angle of the legs, and thus the tripod is featured with a raised cost and an increased probability of failure.

SUMMARY OF THE INVENTION

A primary object of the present invention is to provide a continuously angle-adjustable multifunction tripod with a simple and compact structure, convenient to operate, spans of the legs may be arbitrarily adjusted in a range from 0° to 180°, so that the tripod may be mounted quick and steadily in narrow space or an uneven terrain. The disadvantages of the prior art may be overcome.

To achieve the foregoing object, the present invention adopts the following means:

A continuously angle-adjustable multifunction tripod, comprising: a connecting base and at least three legs, each of the legs has an upper end movably connected to the connecting base, characterized that the continuously angle-adjustable multifunction tripod further comprises an adjusting cap and a supporter positioned on and under the connecting base, respectively, and each of the legs is peripherally distributed around the supporter, wherein a distance between the adjusting cap and the connecting base and a distance between the connecting base and the supporter are adjustable along a vertical direction, can be fixed at anywhere therebetween, and a bottom of the adjusting cap and the supporter clamp and fix each of the legs, so that an angle of each of the legs relative to a horizontal plane can be arbitrarily adjusted in a range from 0° to 90° in accordance with variations of relative positions of the adjusting cap, the connecting base, and the supporter.

Specifically, the connecting base has an upper portion engaged with an inner thread of the adjusting cap, a length of a screwed connection therebetween is adjustable, the supporter is connected to the connecting base via a locking member, and when positions of the adjusting cap, the connecting base and the supporter are relatively fixed, the bottom of the adjusting cap and the supporter clamp the legs so as to fix spans between the legs.

According to an embodiment of the present invention, the connecting base at a center of a bottom surface is configured with a threaded blind hole, the locking member is a bolt member, an upper portion of the bolt member perpendicularly passes through a through hole configuring at a center of the supporter and is then engaged with the threaded blind hole, and the lower portion of the bolt member is a handle.

According to an embodiment of the present invention, the continuously angle-adjustable multifunction tripod further includes a tripod head connecter fixed at an upper surface of the adjusting cap.

According to an embodiment of the present invention, the continuously angle-adjustable multifunction tripod further includes a connection head, a lower portion of the connection head is disposed in a notch configuring at an upper surface of the connecting base, an upper portion of the connection head perpendicularly passes through a through hole configuring at a center of an upper portion of the adjusting cap, the locking member is a bolt member, an upper portion of the bolt member sequentially and perpendicularly passes through a through hole configuring on the supporter and a through hole configuring at the center of the connecting base in order to engage with the threaded blind hole configuring at the center of the bottom surface of the connection head, and a lower portion of the bolt member is a handle.

According to an embodiment of the present invention, the supporter is a member having an annular cross-section.

According to an embodiment of the present invention, the supporter is a bowl shaped member configuring at least three deep notches at an upper fringe for receiving the legs.

According to an embodiment of the present invention, the upper fringe of the supporter is further symmetrically configured with at least three shallow notches for matching with outer walls of the legs.

According to an embodiment of the present invention, the supporter is a support plate configuring at least three deep notches at an outer fringe for receiving the legs and at least three shallow notches for matching with the outer walls of the legs.

According to an embodiment of the present invention, each of the legs comprises an outer tube and at least one inner tube, an upper end of the outer tube is hinge jointed to the connecting base, an lower end of the outer tube is an opening end, the inner tube is movably inserted into the outer tube, a binding member is provided between the inner tube and the outer tube, the binding member comprises a bolt member and a sleeve member, one end of the bolt member passes through the sleeve member and a screw hole on the outer tube and then contacts against the inner tube, and another end of the bolt member is a fastening handwheel.

The continuously angle-adjustable multifunction tripod is mainly constituted by components of an adjusting cap, a supporter and its locking member. The tripod is assembled as an adjusting mechanism for arbitrarily adjusting spans of the legs in a range from 0° to 180° with a simple and compact structure, and it is convenient to operate. The defects of the prior art may be overcome, such as the conventional tripod having an adjusting mechanism for adjusting spans of the legs has a complex structure, inconvenient to operate, and the range of the adjustment is small.

The continuously angle-adjustable multifunction tripod is featured with the following principles of operation:

Assuming that at a certain time the multifunction tripod has its legs opened, and the spans of the legs are fixed, then:

If it is needed to expand the spans of the legs of the tripod, while maintaining the position of the connecting base unchanged, the adjusting cap is upwardly moved for increasing a vertical distance between the adjusting cap and the connecting base, and at the same time the supporter is upwardly moved for decreasing a vertical distance between the supporter and the connecting base. Therefore, the legs driven by the supporter rotate upwardly pivoting the upper ends, so that the spans of the legs are gradually expanded. When the spans are expanded to a desired value, the positions of the adjusting cap, the connecting base and the supporter are relatively fixed again, thus a steady settlement of the tripod with expanded spans of the legs is achieved.

On the contrary, if it is needed to contract the spans of the legs of the tripod, while maintaining the position of the connecting base unchanged, the adjusting cap is downwardly moved for decreasing a vertical distance between the adjusting cap and the connecting base, and at the same time the supporter is downwardly moved for increasing a vertical distance between the supporter and the connecting base. Therefore, the legs driven by its gravity and the adjusting cap rotate downwardly pivoting on the upper ends, so that the spans of the legs are gradually contracted. When the spans are contracted to a desired value, the positions of the adjusting cap, the connecting base and the supporter are relatively fixed again, thus a steady settlement of the tripod with contracted spans of the legs is achieved.

In practical applications, a user is allowed to arbitrarily adjust the spans of the legs in a range from 0° to 180°, by tuning the relative positions of the adjusting cap, the connecting base, and the supporter in accordance with the aforementioned procedures. Comparing with the conventional tripod which can be adjusted by levels only, the present invention is more convenient and more practical.

The structure of the continuously angle-adjustable multifunction tripod may be varied. According to one preferred embodiment, the tripod mainly consists of a connecting head, a connecting base, three or more legs, an adjusting cap, a supporter, and its locking member. The locking member can be a bolt member. Each of the legs has an upper end movably connected to the connecting base. A lower portion of the connecting head is disposed in a notch configured at an upper surface of the connecting base. An upper portion of the connecting head perpendicularly passes through a through hole configured at a center of an upper end of the adjusting cap. An upper portion of the connecting base is engaged with an inner wall of the adjusting cap through a thread. An upper end of the bolt member sequentially and perpendicularly passes through a through hole configuring at the supporter and a through hole configuring at the center of the connecting base, and is then engaged with a threaded blind hole configuring at a center of a lower surface of the connecting head. A lower end of the bolt member is a handle. In such a way, the relative portions of the adjusting cap, the connecting base and the supporter may be changed and the spans of the legs may further be adjusted by only changing the connecting length between the adjusting cap and the connecting base and the connecting length between the bolt member and the connecting head. The operation is very convenient.

However, according to another preferred embodiment of the present invention, the continuously angle-adjustable multifunction tripod mainly consists of a connecting base, three or more legs, an adjusting cap, a supporter and its locking member. The locking member can be a bolt member. Each of the legs has an upper portion movably connected to the connecting base. An upper portion of the connecting base is engaged with an inner wall of the adjusting cap through a thread. An upper end of the bolt member perpendicularly passes through a through hole configuring at the supporter and is then engaged with a threaded blind hole configuring at a center of a lower surface of the connecting base. A lower end of the bolt member is a handle. Further, an upper portion of the adjusting cap may be integrally configured with a tripod head connector or provided a tripod head connector fixed in other ways. The operation of the tripod is similar as the foregoing tripods, while the current embodiment has a more simple and compact structure and a lower production cost.

According to an embodiment of the present invention, the foregoing supporter may be a component with an annular shaped cross-section structure, such as a support plate or a bowl shaped member having an annular shaped upper surface. Further, several deep notches may be configured on a peripheral edge of the supporters for receiving the legs. When it is desired to put away the legs, merely adjust the spans of the legs to a minimum, so that the deep notches configured on the supporters reach the positions corresponding to the legs. The legs are embedded into the deep notches, and then be fastened with a rubber band or a rope. In this case, the tripod is entirely arranged as a rod member which is convenient for carrying or storing. Further, it is preferred to configure several shallow notches matching with the shape of the outer walls of the legs at the peripheral edge of the supporters. In such a way, when the tripod is operated, the lock between the legs and the supporter can be more stable, thus a failure of sliding may not occur.

Further, each of the legs of the continuously angle-adjustable multifunction tripod is constituted of an outer tube and one or more inner tubes. The upper end of the outer tube is hinge jointed to the connecting base, and the lower end of the outer tube is an opening end. The inner tube is movably inserted into the outer tube. A locking member is provided between the inner tube and the outer tube. In such a way, a user may adjust the relative position of the inner tube and the outer tube, so as to change the length of the leg, thus to change a supporting height of the tripod. Comparing with the conventional tripods in which legs can be only adjusted all together, the lengths of the legs of the present invention may be individually adjusted, so that the tripod of the present invention is more widely applicable.

Comparing with the conventional tripods, the present invention has the advantages as follows: the continuously angle-adjustable multifunction tripod has a simple and compact structure, small volume, light weight, low cost, convenient for operation, spans of the legs are continuously angle-adjustable within a range from 0° to 180°, and the lengths of the legs can be individually adjusted. The continuously angle-adjustable multifunction tripod according to the present invention may be mounted quick and steadily in all kinds of complex environments and is adapted for providing a stable support for instruments, such as an astronomic telescope, a camcorder, in order to satisfy the user for reasonably distributing the height and space when observing and photographing and to achieve a good effect. The present invention may be widely applied to areas of observation, photography, and illuminating, etc.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
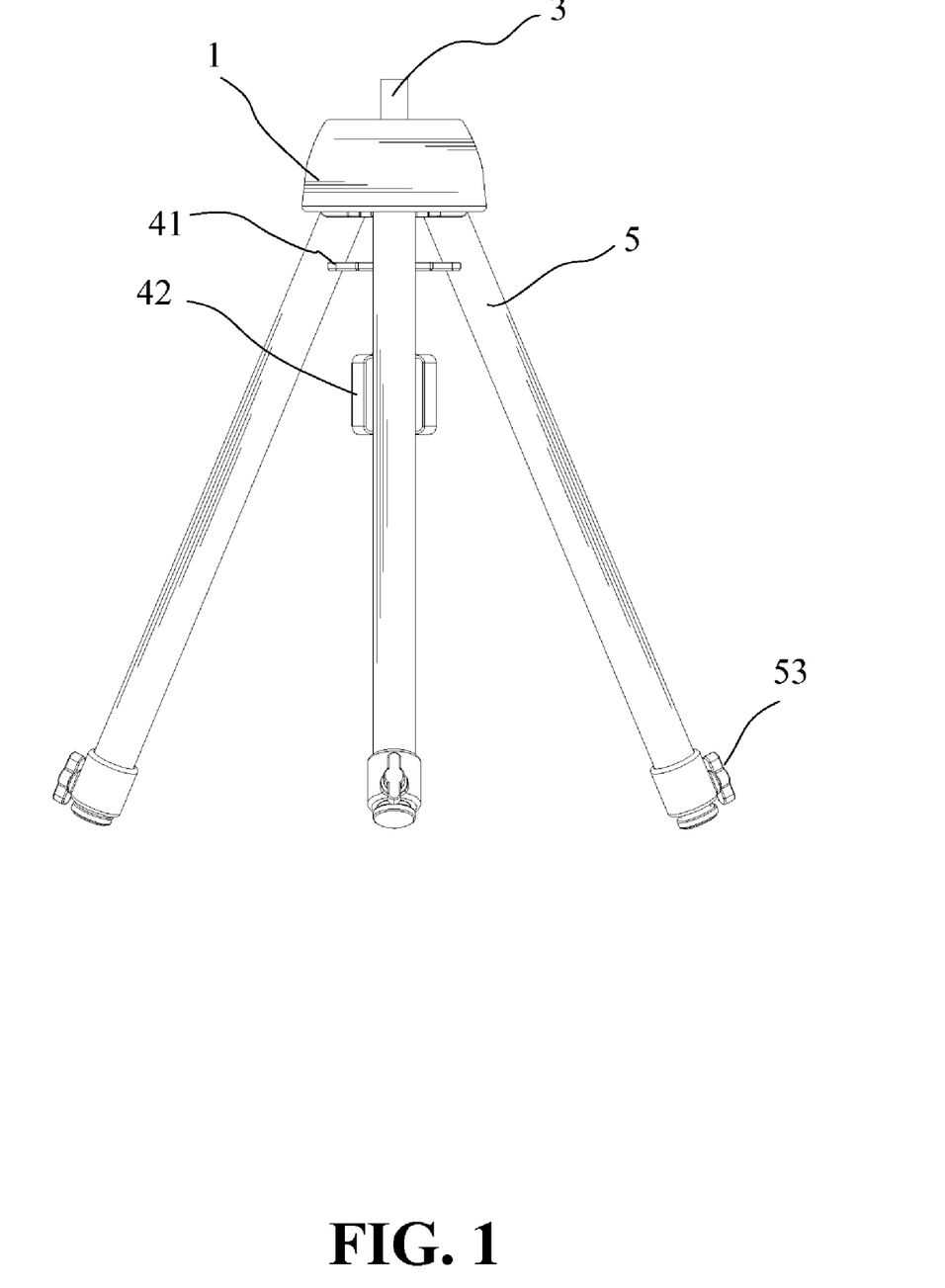
FIG. 1 is a schematic view illustrating the structure of a continuously angle-adjustable multifunction tripod according to a first embodiment of the present invention.
Figure 2:
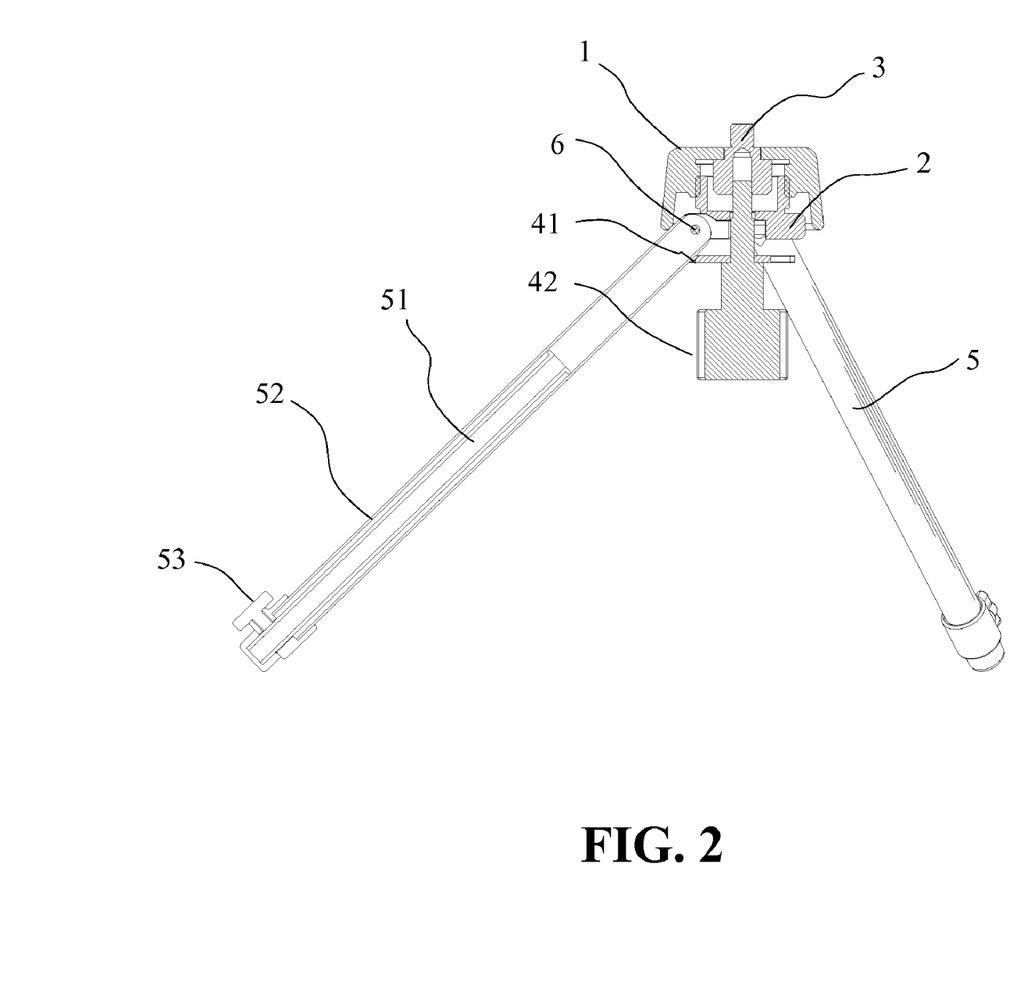
FIG. 2 is a cross-sectional view of the continuously angle-adjustable multifunction tripod according to the first embodiment of the present invention.
Figure 3:
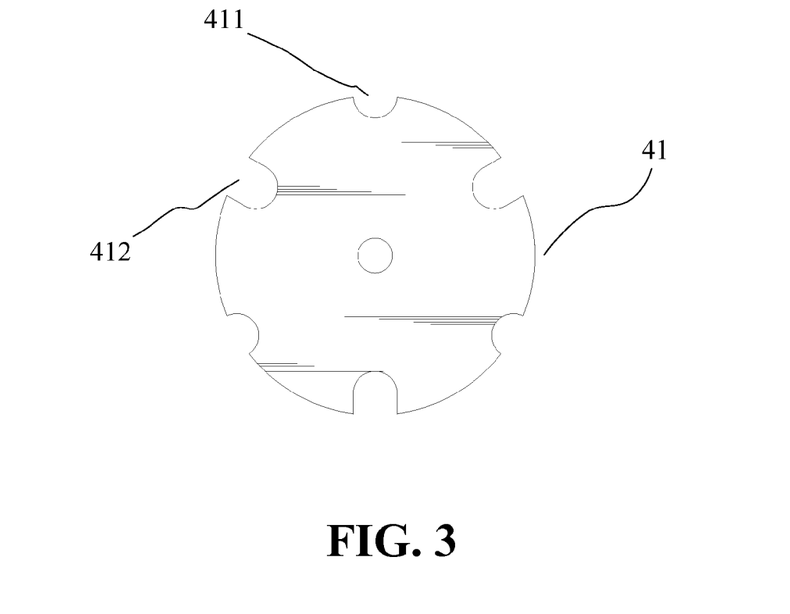
FIG. 3 is a schematic view illustrating the structure of the support plate according to the first embodiment of the present invention.

Referring to FIGS. 1-3, the continuously angle-adjustable multifunction tripod according to the first embodiment of the present invention includes a connecting head 3, a connecting base 2, three legs 5, an adjusting cap 1, a support plate 41, and a bolt member 42. The connecting head 3 has an upper end connecting to a tripod head. The connecting base 2 is disposed in the adjusting cap 1. The inner wall of the adjusting cap 1 and an upper portion of the connecting base 2 are engaged by a thread structure having a certain length. The upper portion of the connecting base 2 is cylinder shaped with an opening at the upper end. The lower end of the connecting base 2 is configured with a through hole at a center thereof. The upper end of the legs 5 are hinge jointed with the lower portion of the connecting base 2 by rivets 6. The support plate 41 is disposed between the legs 5. The connecting head 3, the adjusting cap 1, the connecting base 2 and the support plate 41 are coaxially disposed along the perpendicular direction. A threaded through hole is configured at a center of an upper end of the adjusting cap 1, and the connecting head 3 has an upper portion configuring with a screw structure for matching with the threaded through hole of the adjusting cap 1. The connecting head 3 has a lower end assembled in a notch configuring at the upper portion of the connecting base 2. A threaded blind hole is configured at a bottom surface of the connecting head 3. The upper end of the bolt member 42 passes through a though hole configuring at a center of the support plate 41 and is then engaged with the lower end of the connecting head 3. The lower end of the bolt member 42 is a handle. The support plate 41 has a peripheral edge symmetrically configured with three deep notches 412 for receiving the legs 5 and three shallow notches 411 for matching with outer walls of the legs 5. When positions of the adjusting cap 1, the connecting base 2, and the support plate 41 are relatively fixed, the lower end of the adjusting cap 1 and the support plate 41 clamp and fix each of the legs 5, so as to maintain the spans of the legs 5. By tuning the length of the threaded engagement between the adjusting cap 1 and the connecting base 2, and tuning the length of the threaded engagement between the bolt member 42 and the connecting head 3, the relative positions of the adjusting cap 1, the connecting base 2, and the support plate 41 may be changed, so as to arbitrarily adjust the spans of the legs in a range from 0° to 180°.

Figure 4:
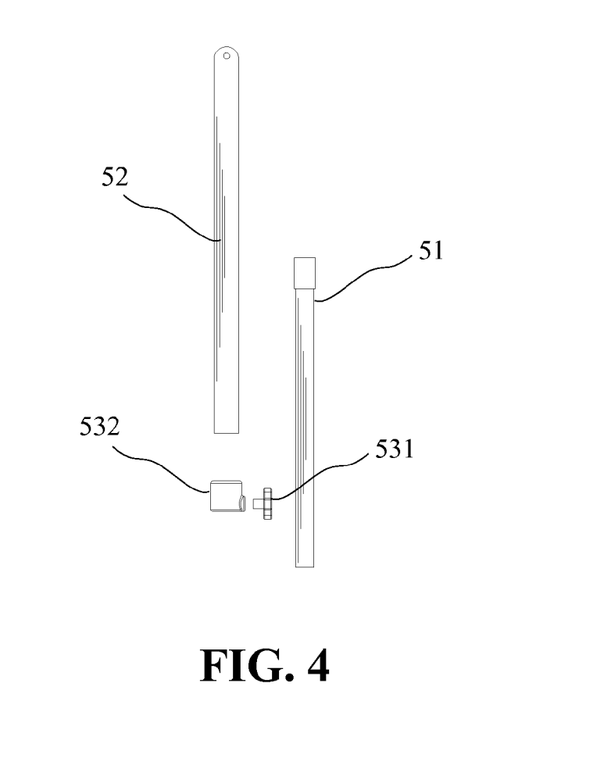
FIG. 4 is a schematic view illustrating the structure of the legs according to the first embodiment of the present invention.

The legs 5 each includes an inner tube 51 and an outer tube 52. The upper end of the outer tube 52 is hinge jointed to the connecting base 2, and the lower end of the outer tube 52 is an opening end. The upper end of the inner tube 51 has a swell portion, and the swell portion has a diameter slightly smaller than the inner diameter of the outer tube 52. The inner tube 51 is movably inserted into the outer tube 52. A binding member 53 is configured between the inner tube 51 and the outer tube 52. The binding member 53 includes a bolt member 531 and a sleeve member 532. One end of the bolt member 531 sequentially passes through the sleeve member 532 and a screw hole configured on the outer tube 52 and contacts against the inner tube 51. Another end of the bolt member 531 is a fastening handwheel.

Figure 5:
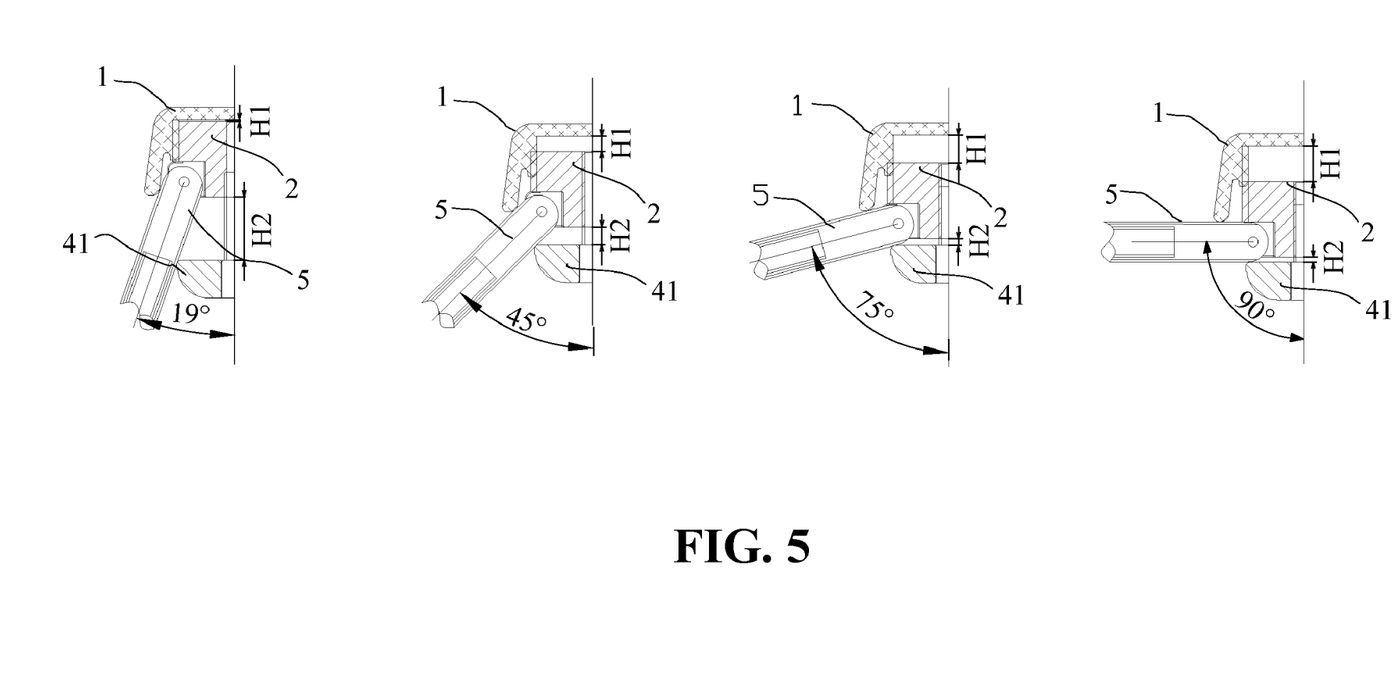
FIG. 5 schematically illustrates the principle of operation of the continuously angle-adjustable multifunction tripod according to the first embodiment of the present invention.

The continuously angle-adjustable multifunction tripod is featured with the following principles of operation:

Assuming that at a certain time the multifunction tripod has its legs opened, and the spans of the legs are fixed, then:

As shown in FIG. 5, if it is needed to expand the spans of the legs 5 of the tripod, while maintaining the position of the connecting base 2 unchanged, rotate the adjusting cap 1 to decrease the threaded connecting length between the adjusting cap 1 and the connecting base 2, and increase the vertical distance H1 between the adjusting cap 1 and the connecting base 2, so the adjusting cap 1 is upwardly moved. At the same time, rotate the bolt member to increase the threaded connecting length between the bolt member and the connecting head, and decrease the vertical distance H2 between the support plate and the connecting base 2, so the support plate is upwardly moved. Therefore, the legs are driven by the supporter to rotate upwardly pivoting the upper ends, so that the spans of the legs are gradually expanded. When the spans are expanded to a desired value, the positions of the support plate and the connecting base are relatively fixed again by the bolt member, thus a steady settlement of the tripod with expanded spans of the legs is achieved.

On the contrary, if it is needed to contract the spans of the legs 5 of the tripod, while maintaining the position of the connecting base 2 unchanged, rotate the adjusting cap 1 to increase the threaded connecting length between the adjusting cap 1 and the connecting base 2, so the adjusting cap 1 is downwardly moved. At the same time, rotate the bolt member to decrease the threaded connecting length between the bolt member and the connecting head, so the support plate is downwardly moved. Therefore, the legs are driven by the supporter to rotate downwardly pivoting the upper ends, so that the spans of the legs are gradually contracted. When the spans are contracted to a desired value, the positions of the support plate and the connecting base are relatively fixed again by the bolt member, thus a steady settlement of the tripod with contracted spans of the legs is achieved.

In accordance with the above described procedures, a user can arbitrarily adjust the spans of the legs of the tripod within a range from 0° to 180° by tuning the relative positions of the adjusting cap 1, the connecting base 2, and the support plate 41.

Figure 6:
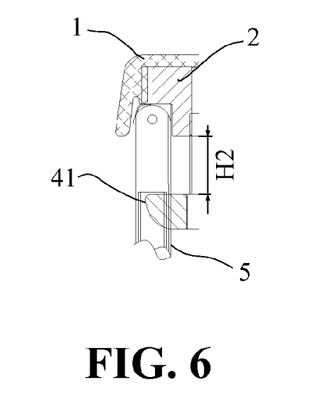
FIG. 6 is a schematic view illustrating a working state of the continuously angle-adjustable multifunction tripod of the first embodiment when the spans of the legs are 0°.
Figure 7:
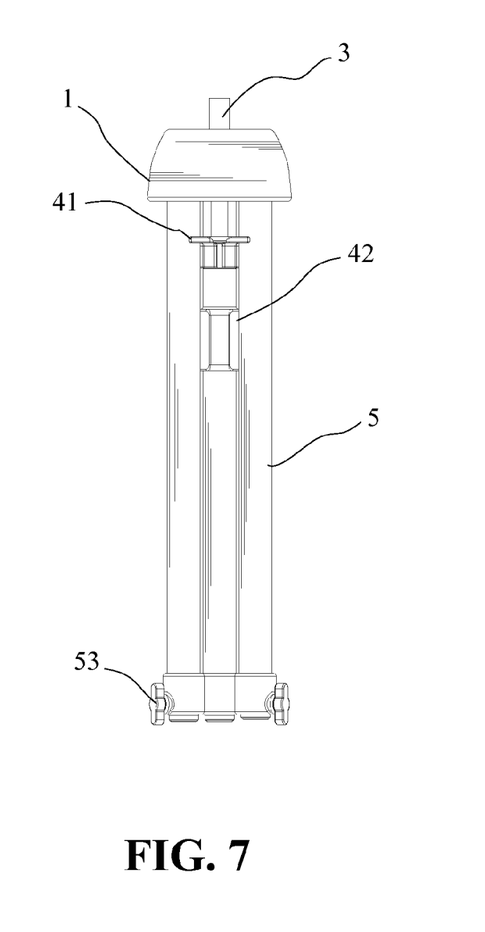
FIG. 7 is a view illustrating a bundled state of the continuously angle-adjustable multifunction tripod of the first embodiment.

When it is desired to put away the legs 5, rotate the bolt member 42 to move the support plate 41 downwardly to a certain position, and then rotate the support plate 41, so that the legs 5 are driven by its gravity to rotate to a perpendicular position, i.e., the angle of the legs 5 and the horizontal plane is 90°. Then, the legs 5 are embedded into each of the deep notches 412, and then fastened with a rubber band or a rope. In this case, the tripod is entirely arranged as a rod member, as shown in FIGS. 6 and 7, which is convenient for carrying or storing.

When such a continuously angle-adjustable multifunction tripod according to the present invention is used for providing support to an instrument, e.g., a surveying and mapping instrument, an astronomical telescope, or a camcorder, in various geographical environments. The user may be allowed to adaptively adjust spans and lengths of the legs 5. The operation is to be discussed in more details below:

When being used on a flat terrain, such as a square or an observation platform, the multifunction tripod may be set up with smaller spans, so that the multifunction tripod may achieve a relatively higher supporting height and may be steadily mounted.

When being used on stairs, the multifunction tripod can be set up with greater spans, in which one of the legs 5 are set on a higher stair, and the rest two legs are set on a lower stair, thus the multifunction tripod may be steadily mounted.

When being used at a bumpy mountain area, a user may choose drop points for each leg in accordance with the angle and the height desired. The user is then allowed to tune the spans of the multifunction tripod, and adjust the lengths of each leg 5, respectively, thus the multifunction tripod may be steadily mounted.

It should be especially noted that the continuously angle-adjustable multifunction tripod presents more advantages than the conventional ones when it is used in a narrow place, such as a small work place, a compartment of a vehicle, or a cave.

Figure 8:
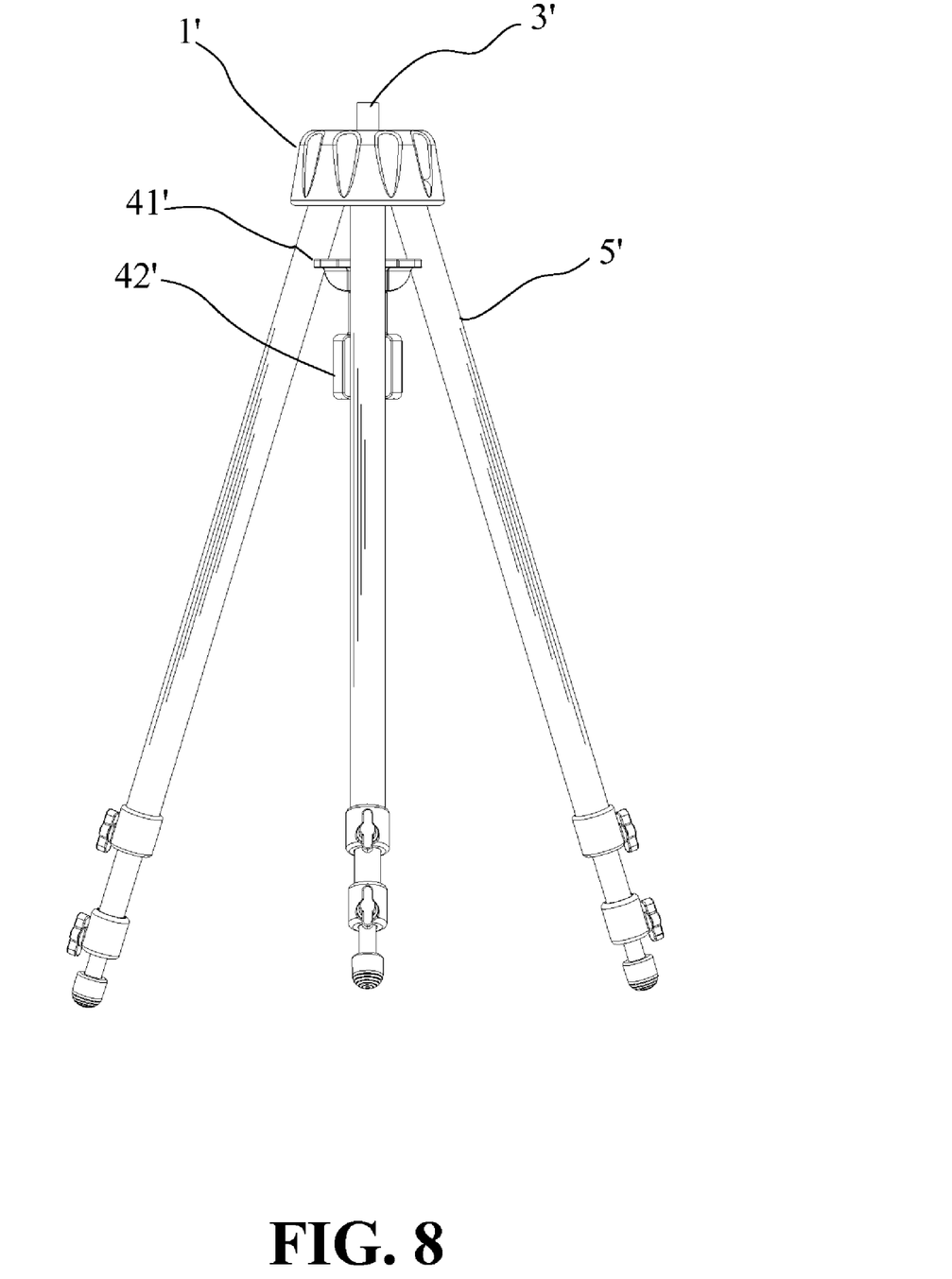
FIG. 8 is a schematic view illustrating the structure of a continuously angle-adjustable multifunction tripod according to a second embodiment of the present invention.
Figure 9:
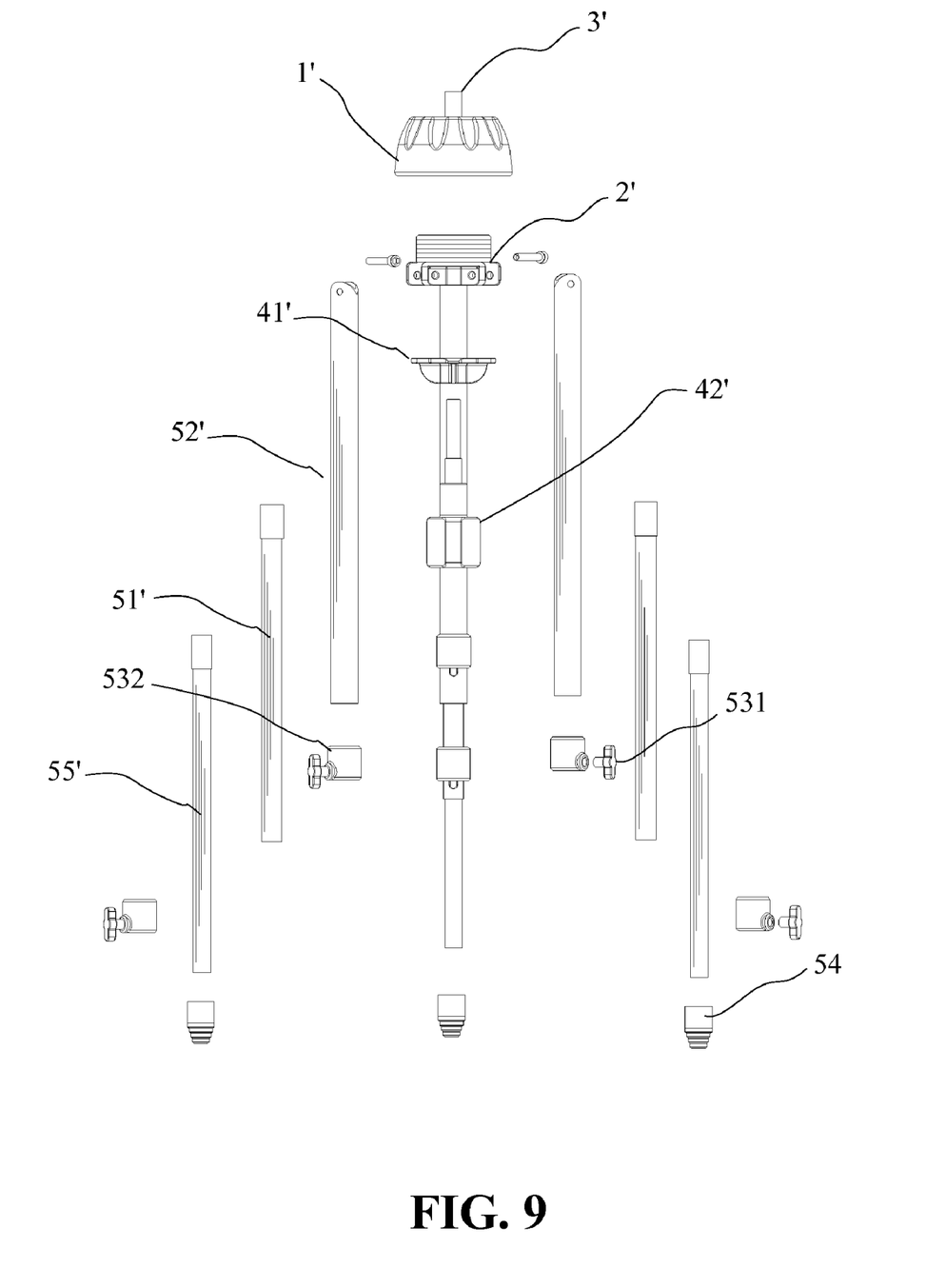
FIG. 9 is an exploded view of the continuously angle-adjustable multifunction tripod according to the second embodiment of the present invention.
Figure 10:
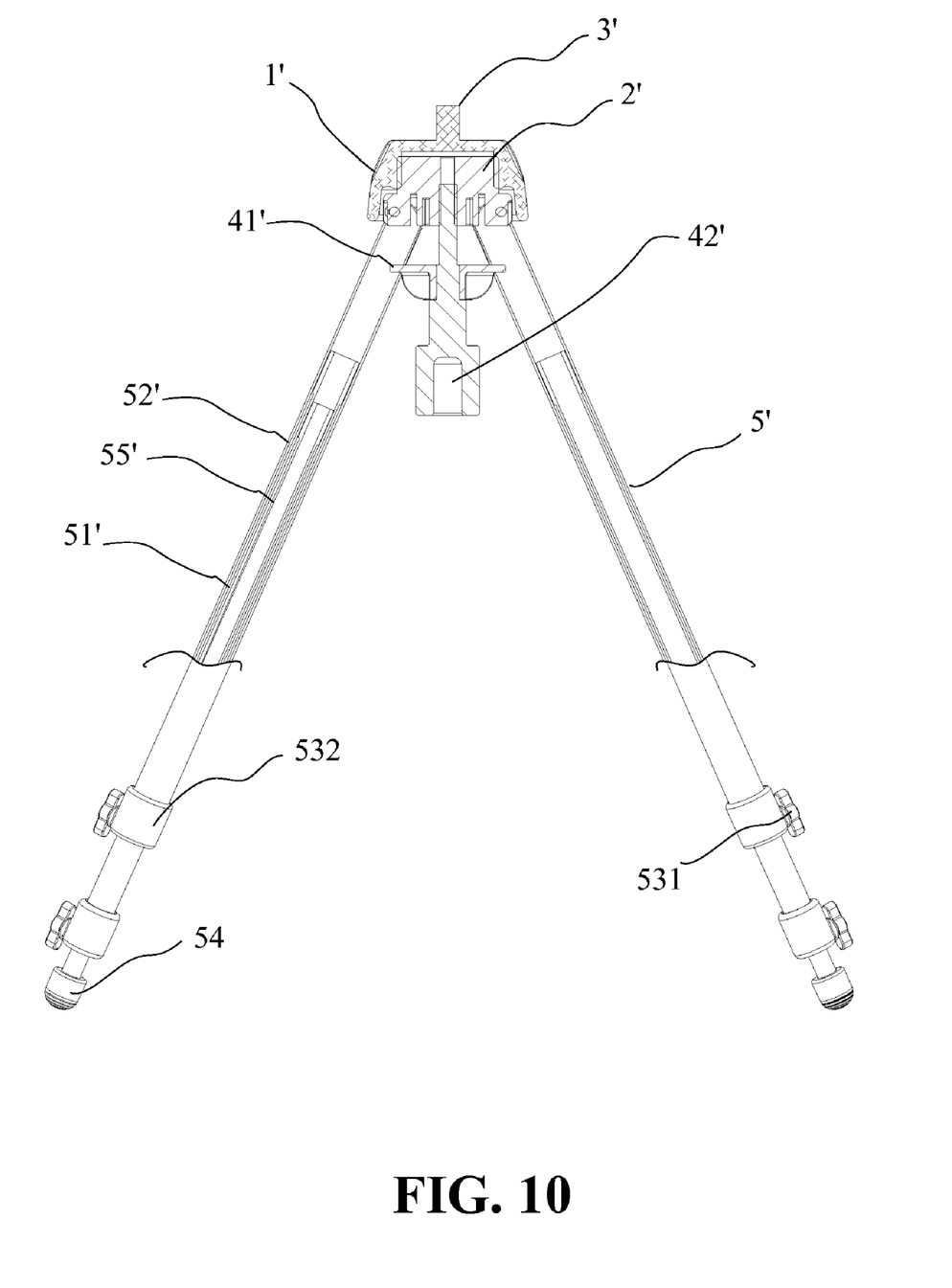
FIG. 10 is a cross-sectional view of the continuously angle-adjustable multifunction tripod according to the second embodiment of the present invention.
Figure 11:
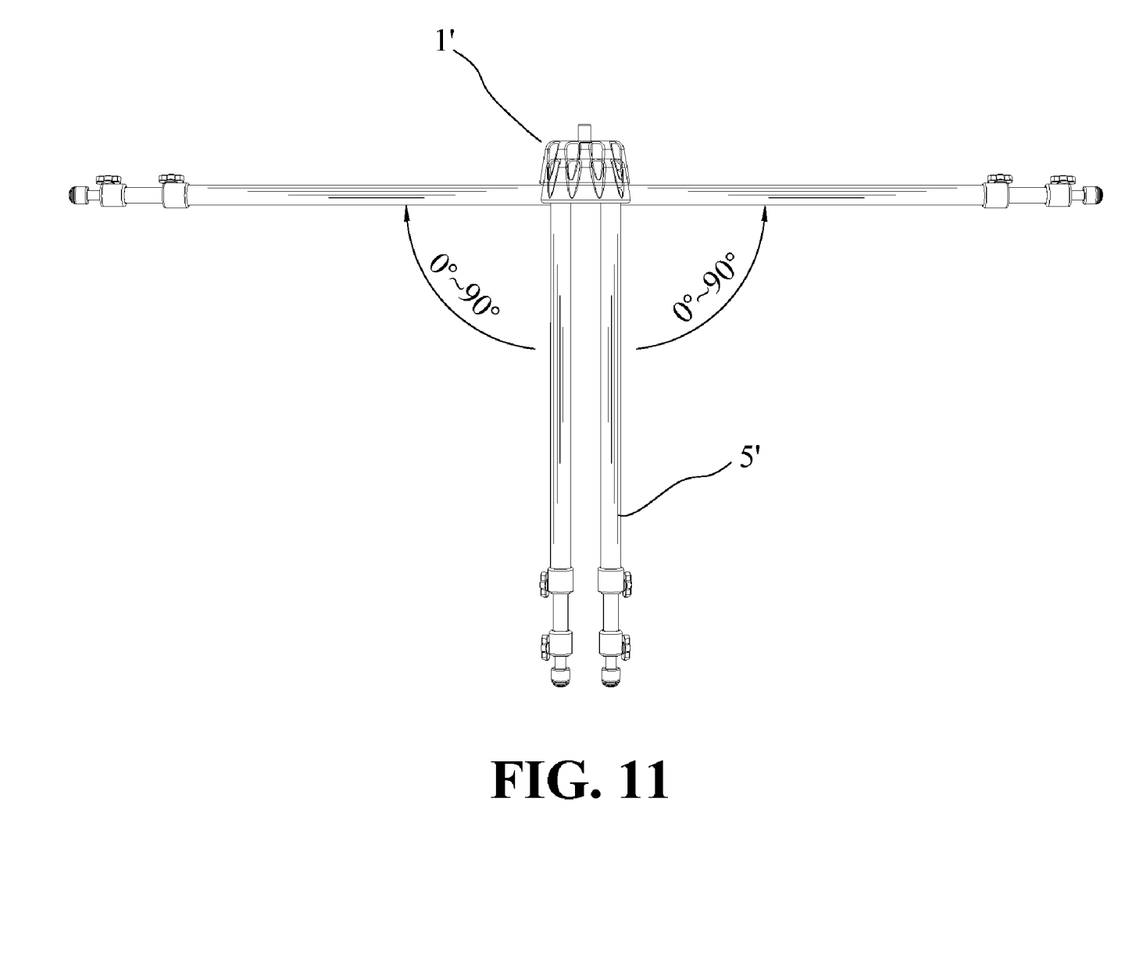
FIG. 11 is a schematic view illustrating the adjustment of the spans of the legs within a range from 0 to 180° according to the second embodiment of the present invention.

Referring to FIGS. 8-10, a span-adjustable multifunction tripod according to the second embodiment of the present invention includes a connecting base 2', three legs 5', an adjusting cap 1', a bowl shaped supporter 41', and a bolt member 42'. The upper portion of the adjusting cap 1' is integrally configured with a tripod head connector 3'. The connecting base 2' is disposed under the adjusting cap 1'. The inner wall of the adjusting cap 1' and the connecting base 2' are engaged with a thread. The upper end of each of the legs 5' are hinge jointed to a periphery edge of the lower portion of the connecting base 2' by rivets. The supporter 41' is disposed between the legs 5'. A threaded blind hole is perpendicularly configured at a center of a bottom surface of the connecting base 2'. The upper end of the bolt member 42' perpendicularly passes through a though hole configuring at a center of the support plate and is then engaged with the threaded blind hole. The lower end of the bolt member 42' is a handle. The supporter 41' has a peripheral bowl edge radially extending out and configuring as an annular shaped structure. The annular shaped structure further symmetrically configured with three deep notches for receiving the legs 5' and three shallow notches for matching with outer walls of the legs 5' at an outer fringe. Each of the legs 5' includes an outer tube 52', a first inner tube 51', and a second inner tube 55'. The upper end of the outer tube 52' is hinge jointed to the connecting base 2', and the lower end of the outer tube 52' is an opening end. The first inner tube 51' is movably inserted into the outer tube 52'. The first inner tube 51' has a lower end which is an opening end. The second inner tube 55' inserts into the first inner tube 52'. The outer tube 52', the first inner tube 51' and the second inner tube 55' are locked by a binding member similar to the one shown in the first embodiment. Each of the lower ends of the legs 5' is further provided with a cover 54. When positions of the adjusting cap 1', the connecting base 2', and the supporter 41' are relatively fixed, the lower end of the adjusting cap 1' and the supporter 41' clamp and fix the legs 5', so as to maintain the legs 5' with unchanged spans. By tuning the length of the threaded engagement between the adjusting cap 1' and the connecting base 2', and tuning the length of the threaded engagement between the bolt member 42' and the connecting base 2', the relative positions of the adjusting cap 1', the connecting base 2', and the supporter 41' may be changed, so as to arbitrarily adjust the spans of the legs in a range from 0° to 180°, as shown in FIG. 11. The principles of operation of the span-adjustable multifunction tripod of the second embodiment are similar to the first embodiment and can be learnt by the foregoing description.

However, it should be further noted that other manners may also be employed for positioning the adjusting cap 1', the connecting base 2', and the support plate. For example, a binding member similar to the binding member 53 of the first embodiment can be employed for relatively locking and unlocking the adjusting cap 1' and the connecting base 2'. The supporter can be configured with a plate member, such as a round shape, a rectangle, a triangle, a star shape, or a member with an annular cross-section, and can be made of different materials, e.g., metals, or engineering plastics. Meanwhile, each of the legs can also be configured with several inner tubes sequentially inserted into the outer tube. The tubes can be configured with a square tube, a round tube, a triangle tube, etc, while the color and the material can also be optionally determined by users.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A continuously angle-adjustable multifunction tripod, comprising:
a connecting base;
at least three legs, each of the legs having an upper end movably connected to the connecting base;
an adjusting cap, positioned on the connecting base; and
a supporter, positioned under the connecting base, the legs being peripherally distributed around the supporter,
wherein a distance between the adjusting cap and the connecting base and a distance between the connecting base and the supporter are adjustable along a vertical direction, can be fixed at anywhere therebetween, and a bottom of the adjusting cap and the supporter clamp and fix each of the legs, so that an angle of each of the legs relative to a horizontal plane can be arbitrarily adjusted in a range from 0° to 90° in accordance with variations of relative positions of the adjusting cap, the connecting base, and the supporter.

2. The continuously angle-adjustable multifunction tripod according to claim 1, wherein the connecting base has an upper portion engaged with an inner thread of the adjusting cap, a length of a screwed connection therebetween is adjustable, the supporter is connected to the connecting base via a locking member, and when positions of the adjusting cap, the connecting base and the supporter are relatively fixed, the bottom of the adjusting cap and the supporter clamp the legs so as to fix spans between the legs.

3. The continuously angle-adjustable multifunction tripod according to claim 2, wherein the connecting base at a center of a bottom surface is configured with a threaded blind hole, the locking member is a bolt member, an upper portion of the bolt member perpendicularly passes through a through hole configured at a center of the supporter and is then engaged with the threaded blind hole, and the lower portion of the bolt member is a handle.

4. The continuously angle-adjustable multifunction tripod according to claim 1, wherein a tripod head connecter is fixed at an upper surface of the adjusting cap.

5. The continuously angle-adjustable multifunction tripod according to claim 1, wherein the tripod further comprises a connection head, a lower portion of the connection head is disposed in a notch configured at an upper surface of the connecting base, an upper portion of the connection head perpendicularly passes through a through hole configured at a center of an upper portion of the adjusting cap, the locking member is a bolt member, an upper portion of the bolt member sequentially and perpendicularly passes through a through hole configured on the supporter and a through hole configured at the center of the connecting base in order to engage with the threaded blind hole configured at the center of the bottom surface of the connection head, and a lower portion of the bolt member is a handle.

6. The continuously angle-adjustable multifunction tripod according to claim 1, wherein the supporter is a member having an annular cross-section.

7. The continuously angle-adjustable multifunction tripod according to claim 6, wherein the supporter is a bowl shaped member configuring at least three deep notches at an upper fringe for receiving the legs.

8. The continuously angle-adjustable multifunction tripod according to claim 7, wherein the upper fringe of the supporter is further symmetrically configured with at least three shallow notches for matching with outer walls of the legs.

9. The continuously angle-adjustable multifunction tripod according to claim 6, wherein the supporter is a support plate configuring at least three deep notches at an outer fringe for receiving the legs and at least three shallow notches for matching with the outer walls of the legs.

10. The continuously angle-adjustable multifunction tripod according to claim 1, wherein each of the legs comprises an outer tube and at least one inner tube, an upper end of the outer tube is hinge jointed to the connecting base, an lower end of the outer tube is an opening end, the inner tube is movably inserted into the outer tube, a binding member is provided between the inner tube and the outer tube, the binding member comprises a bolt member and a sleeve member, one end of the bolt member passes through the sleeve member and a screw hole on the outer tube and then contacts against the inner tube, and another end of the bolt member is a fastening handwheel.

* * * * *